United States Patent
Sigmund

(10) Patent No.: US 7,909,732 B2
(45) Date of Patent: Mar. 22, 2011

(54) SELECTABLE DRIVETRAIN CONTROL FOR A VEHICLE

(75) Inventor: Joshua Sigmund, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/839,629

(22) Filed: Jul. 20, 2010

(65) Prior Publication Data

US 2010/0285923 A1  Nov. 11, 2010

Related U.S. Application Data

(62) Division of application No. 11/686,062, filed on Mar. 14, 2007, now Pat. No. 7,771,312.

(51) Int. Cl.
*B60W 10/06* (2006.01)

(52) U.S. Cl. .................. 477/107; 477/101; 477/110

(58) Field of Classification Search .......... 477/101, 477/107, 110, 111

See application file for complete search history.

(56) References Cited

U.S. PATENT DOCUMENTS

| 4,964,051 | A | * | 10/1990 | Sekozawa et al. | 701/102 |
| 5,239,963 | A | * | 8/1993 | Ikebe et al. | 477/102 |
| 5,759,134 | A | * | 6/1998 | Kuriyama | 477/158 |
| 6,742,498 | B2 | * | 6/2004 | Mabuchi et al. | 123/339.16 |
| 7,231,286 | B2 | * | 6/2007 | Jeon | 701/54 |

* cited by examiner

*Primary Examiner* — Ha D. Ho
(74) *Attorney, Agent, or Firm* — Gregory J. Burke; Michael A. Forhan; Eley Law Firm Co.

(57) ABSTRACT

A selectable drivetrain control for a vehicle includes a controller configured to receive input signals and issue predetermined output command signals corresponding to the status of the input signals. A first sensor is configured to provide an input signal to the controller relating to the actuation status of a brake pedal. A second sensor is configured to provide an input signal to the controller relating to the actuation status of an accelerator pedal. A stability control selector is configured to provide an input signal to the controller relating to the engagement status of a stability control system of the vehicle. A drivetrain is configured to receive output command signals from the controller. The controller issues output command signals to the drivetrain to control the operational characteristics of the drivetrain, responsive to the engagement status of the stability control system while the brake and accelerator pedals are simultaneously actuated.

20 Claims, 4 Drawing Sheets

SELECTABLE DRIVETRAIN CONTROL FOR A VEHICLE

This application is a divisional of co-pending U.S. patent application Ser. No. 11/686,062, filed Mar. 14, 2007, the entire contents of which are hereby incorporated herein by reference thereto.

FIELD

The present invention relates generally to a selectable drivetrain control for a vehicle, in particular to a control to selectably set a transmission gear position, limit the displacement of a throttle and limit ignition timing while the vehicle's brake and accelerator pedals are simultaneously actuated.

BACKGROUND

A motor vehicle driver typically controls the speed of a conventional vehicle using foot pedals, which in a vehicle with an automatic transmission are the accelerator pedal and the brake pedal. Drivers will normally use the same foot to control both the accelerator pedal and the brake pedal. However, some drivers of automatic transmission vehicles use two feet, one to actuate the accelerator pedal and the other to actuate the brake pedal. This can result in simultaneous activation of both the vehicle brake and throttle. In certain situations a stall condition may occur due to simultaneous activation of both the brake and the throttle, subjecting the vehicle's drivetrain to significant stress.

Others have attempted to limit drivetrain stress due to simultaneous actuation of the vehicle's brake and accelerator pedals by reducing or limiting the throttle setting under such conditions, thereby limiting the amount of torque generated by the vehicle's engine and delivered to a transmission system. An example may be found in U.S. Pat. No. 6,125,315, issued to Kon, the contents of which are hereby incorporated herein by reference. The system disclosed by Kon limits the degree of opening of the throttle when a stall condition is detected, thereby reducing stress imposed on the vehicle's drivetrain. However, such systems do not address the unique stresses imposed upon a four-wheel drivetrain when a vehicle is operated such that the brake and accelerator pedals are actuated under road conditions wherein some, but not all, of the wheels lose traction.

For example, many vehicles are now equipped with an "on-demand" four-wheel drive transmission system wherein a varying amount of torque is provided to each axle in order to maintain traction under varying road conditions. One of the most severe of these road conditions occurs when the wheels of one axle of the vehicle lose traction due to, for example, ice or snow while the wheels of the other axle retain traction. When launching the vehicle from a stalled state under these conditions a large amount of torque is transferred to the axle having traction due to the lack of traction in the other axle, thereby imposing significant stress upon the drivetrain. However, if a vehicle under the same conditions is equipped with a vehicle stability control system the amount of torque transferred to the axle having traction may be reduced because the vehicle stability system limits and compensates for a loss of traction in the other axle by reducing engine power and applying brake intervention to reduce wheel slip on low traction surfaces. This reduction of wheel slip reduces the amount of torque transferred to the axle having traction, thereby reducing stress on the drivetrain.

It would be desirable to utilize a vehicle's traction control system in conjunction with a throttle limiting system in order to tailor the operating performance of the vehicle under stall launch conditions wherein the brake and throttle are activated simultaneously. Such a system would be particularly useful for increasing the operating performance of an on-demand four-wheel drive transmission under varying road conditions while still protecting the drivetrain from damage.

SUMMARY

The present invention utilizes the engagement status of a vehicle stability/traction control system to establish the operational parameters of the vehicle's drivetrain when the brake and accelerator pedals are simultaneously actuated. In a first "performance" configuration, when the vehicle stability/traction control is engaged by the driver and the brake and accelerator are simultaneously actuated, the vehicle's transmission is automatically placed into first gear and the vehicle's throttle is automatically set to a predetermined reduced setting. Conversely, in a second "preservation" configuration, when the vehicle stability/traction control is disengaged by the driver and the brake and accelerator pedals are simultaneously actuated, the transmission is placed into second gear while the throttle is set to a predetermined reduced setting that is lower than that of the "performance" configuration.

One aspect of the present invention is a selectable drivetrain control for a vehicle. The drivetrain control includes a controller configured to receive input signals and issue predetermined output command signals corresponding to the status of the input signals. A first sensor is configured to provide an input signal to the controller relating to the actuation status of a brake pedal. A second sensor is configured to provide an input signal to the controller relating to the actuation status of an accelerator pedal. A stability control selector is configured to provide an input signal to the controller relating to the engagement status of a stability control system of the vehicle. A drivetrain is configured to receive output command signals from the controller. The controller issues output command signals to the drivetrain to control the operational characteristics of the drivetrain, responsive to the engagement status of the stability control system while the brake and accelerator pedals are simultaneously actuated.

Another aspect of the present invention is a method for controlling the operational characteristics of a drivetrain of a vehicle. The method includes the steps of monitoring the actuation status of a brake pedal, an accelerator pedal and a stability control system of the vehicle. While both the brake pedal and accelerator pedal are simultaneously actuated and the stability control system is not engaged, a throttle of an engine of the drivetrain is set to a first predetermined position. An engine ignition timing advance is set to a position corresponding to the first throttle position. A first gear setting of a transmission of the drivetrain is also selected. While both the brake pedal and accelerator pedal are simultaneously actuated and the stability control system is engaged, the throttle is set to a second predetermined position. Furthermore, the ignition timing advance is set to a position corresponding to the second throttle position. Lastly, a second transmission gear setting is selected.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
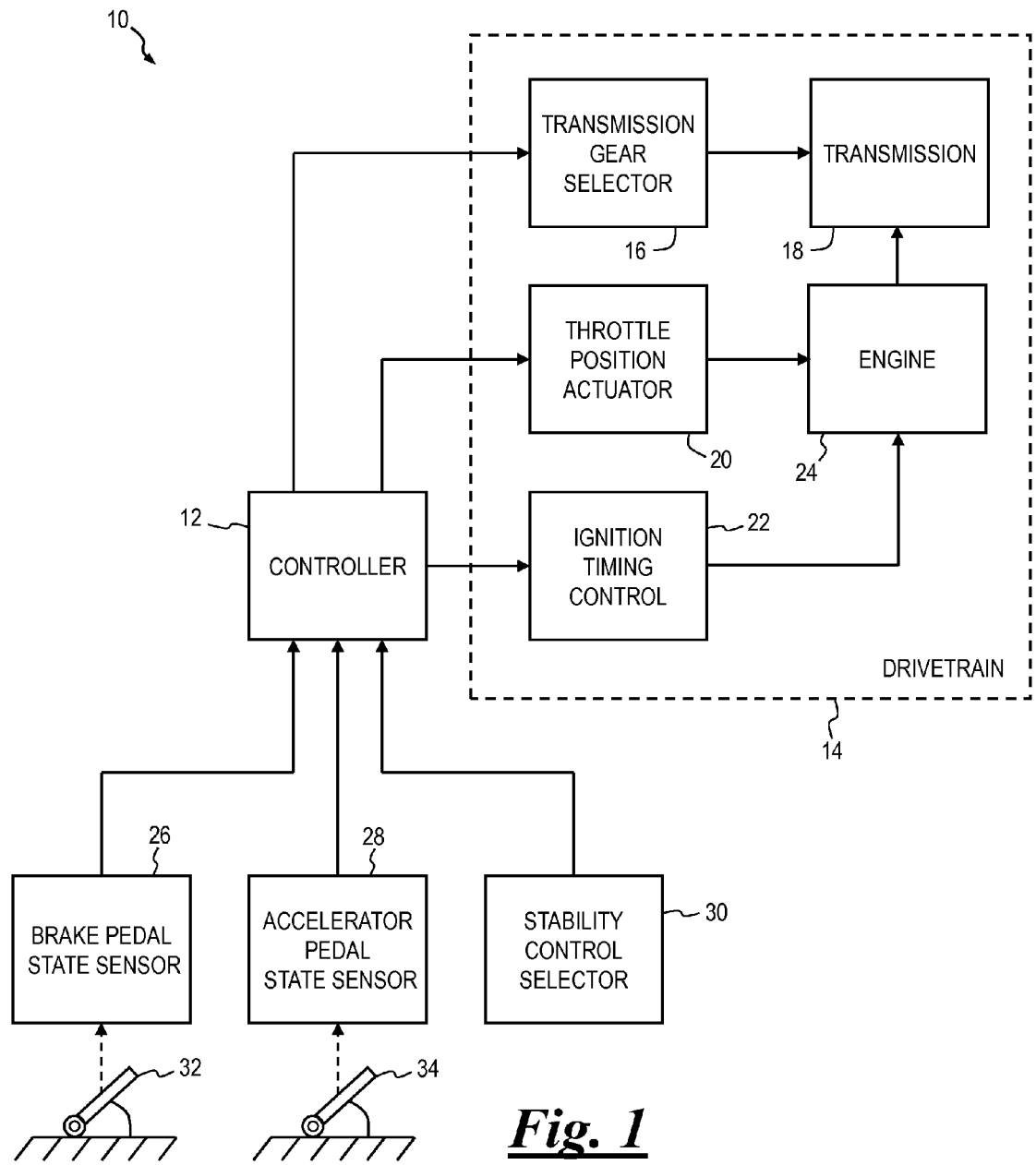
FIG. 1 is a schematic block diagram showing the general arrangement of a relevant portion of a vehicle drivetrain control system according to an embodiment of the present invention.

A schematic block diagram showing the general arrangement of a relevant portion of a drivetrain control system 10 for a vehicle according to an embodiment of the present invention is shown in FIG. 1. System 10 comprises a controller 12 configured to control the operation of a drivetrain 14 coupled thereto. Drivetrain 14 includes in pertinent part a transmission gear selector 16 that is coupled to an automatic transmission 18. Drivetrain 14 further includes a throttle position actuator 20 and an ignition timing control 22, each coupled to an engine 24.

Controller 12 receives status signals from any or all of a brake pedal state sensor 26, an accelerator pedal state sensor 28, and a stability control selector 30, and controls the operation of system 10 in a predetermined manner. Example control tasks for controller 12 may include, without limitation, providing predetermined output command signals to any or all of transmission gear selector 16, throttle position actuator 20 and ignition timing control 22, the command signals corresponding to the condition of the status signals. Controller 12 may also detect fault conditions with the components of system 10 and/or interconnections thereof. Non-limiting example fault conditions may include internal faults within controller 12, open or shorted electrical connections, low input power supply voltage to system 10, and predetermined fault conditions present in any or all of transmission gear selector 16, throttle position actuator 20 ignition timing control 22, brake pedal state sensor 26, accelerator pedal state sensor 28 and stability control selector 30. Controller 12 may be configured using conventional analog or digital electronic circuitry or a combination thereof, and may utilize conventional memory devices such as magnetic, electronic and optical memory storage devices containing a predetermined set of instructions, such as a computer program.

Transmission gear selector 16 may be any type of device suitable for receiving an electrical gear selection command signal from controller 12 and selecting a corresponding gear setting of automatic transmission 18. Example devices include, without limitation, actuators, clutches, solenoids, relays and electro-hydraulic cylinders. Transmission gear selectors are well-known in the art and thus will not be detailed further herein.

Transmission 18 may be any conventional type of automatic transmission configured to transmit power from engine 24 to a set of drive wheels (not shown) including, without limitation, a front-wheel drive transmission, rear-wheel drive transmission, a selectable four-wheel drive transmission, an all-wheel drive transmission and an on-demand four-wheel drive transmission. Such transmissions are well-known in the art and thus will not be detailed further herein.

Throttle position actuator 20 may be any conventional type of device suitable for receiving an electrical throttle command signal from controller 12 and setting an air/fuel mixture of a fuel supply for engine 24 to a predetermined flow quantity and mixture ratio corresponding in a predetermined manner to the electrical throttle command, resulting in a predetermined engine speed. Example throttle position controls include, without limitation, electro-mechanical actuators, electro-hydraulic cylinders, and relays. Throttle position actuators are well-known in the art and thus will not be detailed further herein.

Ignition timing control 22 may be any conventional type of device suitable for receiving an electrical timing control signal from controller 12 and setting the timing of the ignition system of engine 24 to a predetermined advance corresponding to the throttle position of the engine. Example ignition timing controls include actuators, relays and valves suitable for controlling any or all of a mechanical, vacuum, or electronic ignition control of engine 24. Ignition timing and advance controls are well-known in the art and thus will not be detailed further herein.

Engine 24 may be any type of engine now known or later developed that generates motive power for a vehicle. Examples include, without limitation, internal combustion (IC) engines, hybrid electric-IC engines and electric motors.

Brake pedal state sensor 26 provides a status signal to controller 12 as to whether or not a brake pedal 32 of the vehicle is being actuated by the driver. Brake pedal state sensor 26 may be any type of conventional mechanical or electrical encoder, transducer or switch. Brake pedal state sensor 26 may be powered by controller 12, or may be separately powered. The status signal provided to controller 12 by brake pedal state sensor 26 may be any form of digital or analog electrical signal compatible with the controller.

Accelerator pedal state sensor 28 provides a status signal to controller 12 as to whether or not an accelerator pedal 34 of the vehicle is being actuated by the driver. Accelerator pedal state sensor 28 may be any type of conventional mechanical or electrical encoder, transducer or switch. Accelerator pedal state sensor 28 may be powered by controller 12, or may be separately powered. The status signal provided to controller 12 by accelerator pedal state sensor 28 may be any form of digital or analog electrical signal compatible with the controller.

Stability control selector 30 is a control, such as a switch actuable by the driver of the vehicle to enable or disable a stability control system of the vehicle. Stability control selector 30 is typically located within convenient reach of the driver, on the dashboard or the gear selector lever. Alternatively, stability control selector 30 may be a conventional sensing device configured to monitor the stability control system and provide to controller 12 a status signal indicating whether or not the stability control system is engaged. The stability control system, when engaged by actuation of stability control selector 30, automatically detects when the vehicle has deviated from the driver's steered direction and compensates for oversteering, understeering and instability by selectively braking individual wheels and/or reducing engine torque to bring the vehicle back on course. Such systems are well-known in the art and are commonly termed as "dynamic stability control," "stability control program" and "electronic stability control," among others.

With reference now to FIGS. 1, 2 and 3A-3D in combination, the operation of system 10 will now be described. The operation of system 10 begins at step s100, controller 12 first checking brake pedal state sensor 26 at step s102 to determine whether brake pedal 32 is being depressed (i.e., actuated) by the driver of the vehicle. If brake pedal 32 is depressed (FIG. 3C), controller 12 checks accelerator pedal state sensor 28 at step s104 to determine whether accelerator pedal 34 is also being depressed (i.e., actuated) by the driver. If accelerator pedal 34 is also being depressed (FIG. 3A), controller 12 checks stability control selector 30 at step s106 to determine whether the stability control system is engaged.

Figure 3A:
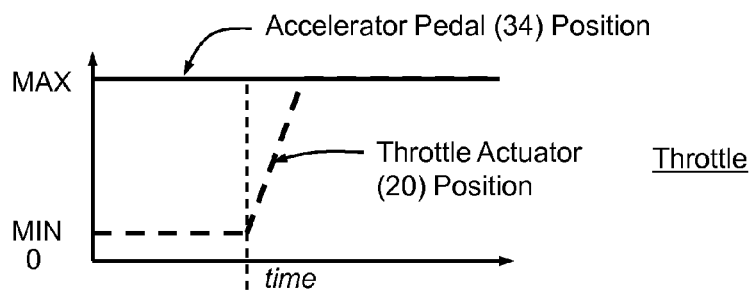
FIG. 3A is a graph of throttle response versus depression of an accelerator pedal with respect to time for a first condition of the system of FIG. 1.
Figure 3B:
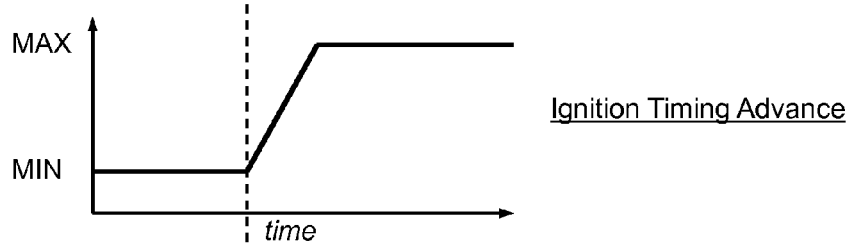
FIG. 3B is a graph of engine ignition timing advance with respect to time for a first condition of the system of FIG. 1.
Figure 3C:
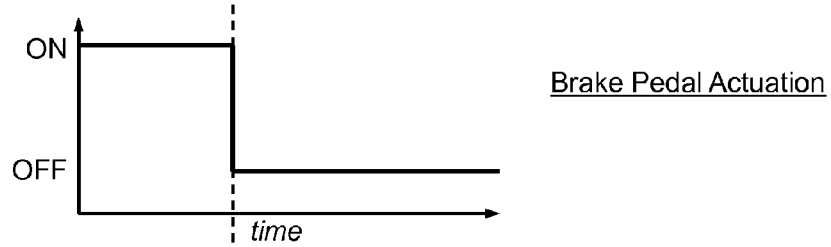
FIG. 3C is a graph of brake pedal actuation state with respect to time for a first condition of the system of FIG. 1.
Figure 3D:
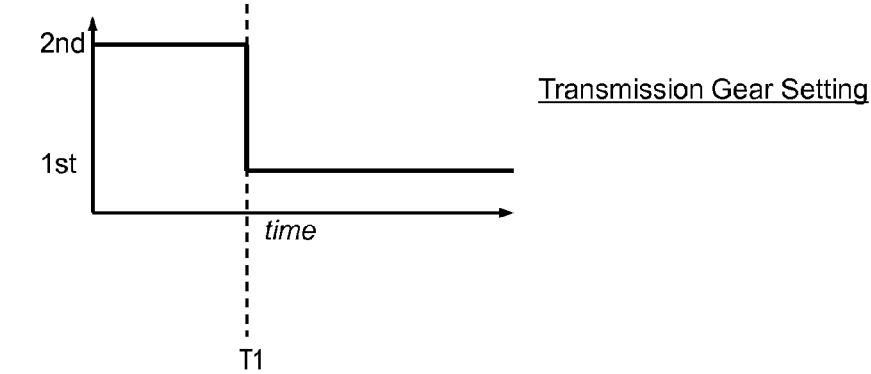
FIG. 3D is a graph of transmission gear setting with respect to time for a first condition of the system of FIG. 1.

If stability control selector 30 indicates that the stability control system is not engaged, as at s108, drivetrain protection steps s110, s112 and s114 are executed. Controller 12 issues output commands to throttle position actuator 20 at step s110 to set the actuator 20 (and, accordingly, engine 24) to a predetermined minimum throttle condition (FIG. 3A). Controller 12 also issues commands to ignition timing control 22 to set the ignition advance to a predetermined minimum advance setting corresponding to the predetermined minimum setting of throttle position actuator 20. Controller 12 likewise issues commands to transmission gear selector 16 to place transmission 18 into a predetermined intermediate gear setting, such as second gear (FIG. 3D). In this configuration, even if the driver fully depresses accelerator pedal 34 while actuating brake pedal 32 as indicated by FIGS. 3A and 3C, the amount of torque developed by engine 24 is at a predetermined minimal value as indicated by the throttle position (FIG. 3A) and ignition timing advance (FIG. 3B). These conditions continue while brake pedal 32 and accelerator pedal 34 are simultaneously depressed, thereby protecting transmission 18 and engine 24 from high stress levels that could result in excess wear or damage thereto.

When brake pedal 34 is released at a subsequent time "T1" (FIG. 3C), controller 12 responds at step s115 by issuing commands to transmission gear selector 16 to place transmission 18 into first gear (FIG. 3D). Furthermore, controller 12 issues normal-operation restoration commands to throttle position actuator 20 and ignition timing control 22 to allow for a ramp-up of engine 24 throttle (FIG. 3A) and ignition timing advance (FIG. 3B), providing for a gradual increase in drivetrain 14 output to amount that corresponds in a predetermined manner to the position of accelerator pedal 34. Normal throttle, ignition timing and transmission gear selection of drivetrain 14 are then maintained and steps s100, s102, s104 and s115 are repeated while brake pedal 32 and accelerator pedal 34 are not simultaneously actuated.

Figure 4A:
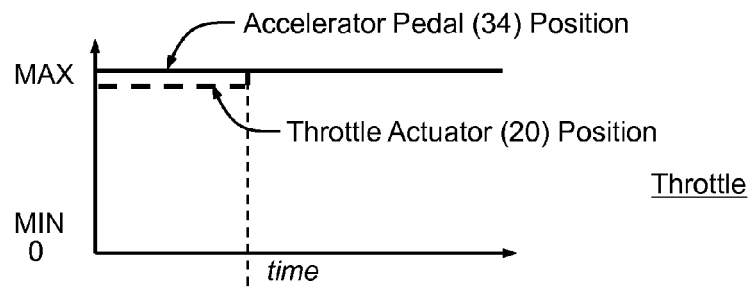
FIG. 4A is a graph of throttle response versus depression of an accelerator pedal with respect to time for a second condition of the system of FIG. 1.

If both the brake and accelerator pedals 32, 34 are actuated at steps s102, s104 and if stability control selector 30 indicates that the stability control system is engaged, as at s116, drivetrain performance limiting steps s118, s120 and s122 are executed as illustrated by reference to FIGS. 1 and 4A-4D. Controller 12 issues commands to throttle position actuator 20 at step s118 to set actuator 20 (and, accordingly, engine 24) to a predetermined maximum throttle condition corresponding to the position of accelerator pedal 34. (FIG. 4A). Controller 12 also issues commands to ignition timing control 22 to set the ignition advance to a predetermined maximum-limit advance setting corresponding to a predetermined maximum setting of throttle position actuator 20. Controller 12 likewise issues commands to transmission gear selector 16 to place transmission 18 into a predetermined low gear setting, such as first gear (FIG. 4D). In this configuration the throttle position and ignition timing of engine 24 are limited by system 10 to the predetermined maximum-limit value, thereby providing drivetrain 14 with a greater amount of torque for greater vehicle performance than is available when stability control selector 30 is OFF. This may be desirable under certain adverse conditions, such as freeing the vehicle when mired in snow or mud.

When brake pedal 34 is released (i.e., de-actuated) at a subsequent time "T2" (FIG. 4C), controller 12 responds at step s115 by issuing normal-operation restoration commands to throttle position actuator 20 and ignition timing control 22 to allow for an increase in engine 24 throttle (FIG. 4A) and ignition timing advance (FIG. 4B), providing for an increase in drivetrain 14 output from the maximum-limit setting to an amount that corresponds in a predetermined manner to the position of accelerator pedal 34. Normal throttle, ignition timing and transmission gear selection of drivetrain 14 are then maintained and steps s100, s102, s104 and s115 are repeated while brake pedal 32 and accelerator pedal 34 are not simultaneously actuated.

Figure 4B:
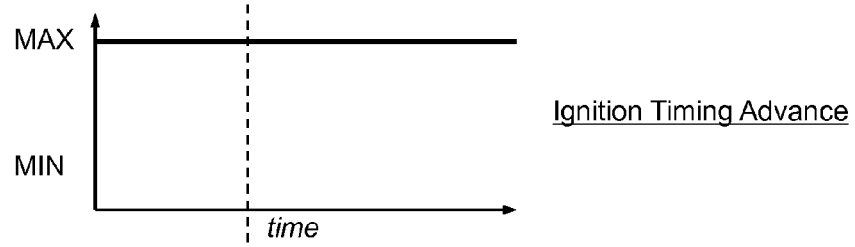
FIG. 4B is a graph of engine ignition timing advance with respect to time for a second condition of the system of FIG. 1.
Figure 4C:
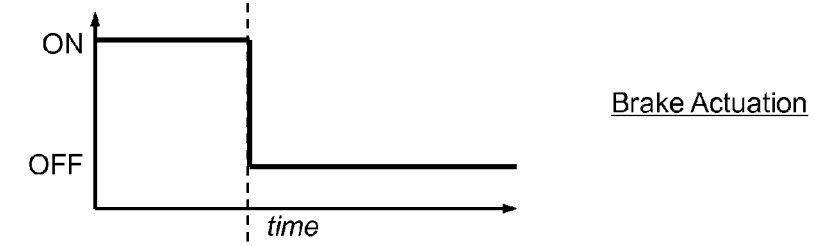
FIG. 4C is a graph of brake pedal actuation state with respect to time for a second condition of the system of FIG. 1.
Figure 4D:
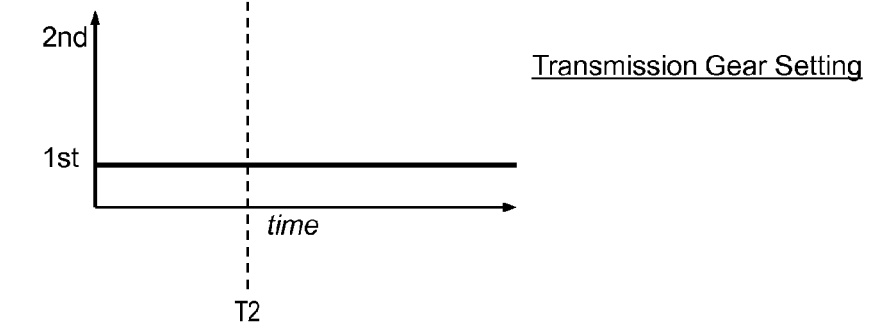
FIG. 4D is a graph of transmission gear setting with respect to time for a second condition of the system of FIG. 1.

It should be noted that the predetermined maximum-limit throttle and ignition advance settings for the conditions of steps s118, s120, s122 shown in FIGS. 4A and 4B are not necessarily equal to the maximum settings that can be obtained when brake pedal 32 and accelerator pedal 34 are not simultaneously depressed. For example, in some embodiments of the present invention the predetermined maximum-limit throttle setting and maximum-limit ignition advance timing may be significantly less than the maximum settings available for engine 24 under normal vehicle operating conditions wherein brake pedal 32 and accelerator pedal 34 are not simultaneously actuated. The predetermined maximum-limits for the throttle setting and ignition advance timing are preferably established such that a greater amount of power is transmitted to the drive wheels of the vehicle than the drivetrain protection mode steps s110, s112, s114 while still providing a measure of protection against damage or excessive wearing of drivetrain 14.

Figure 2:
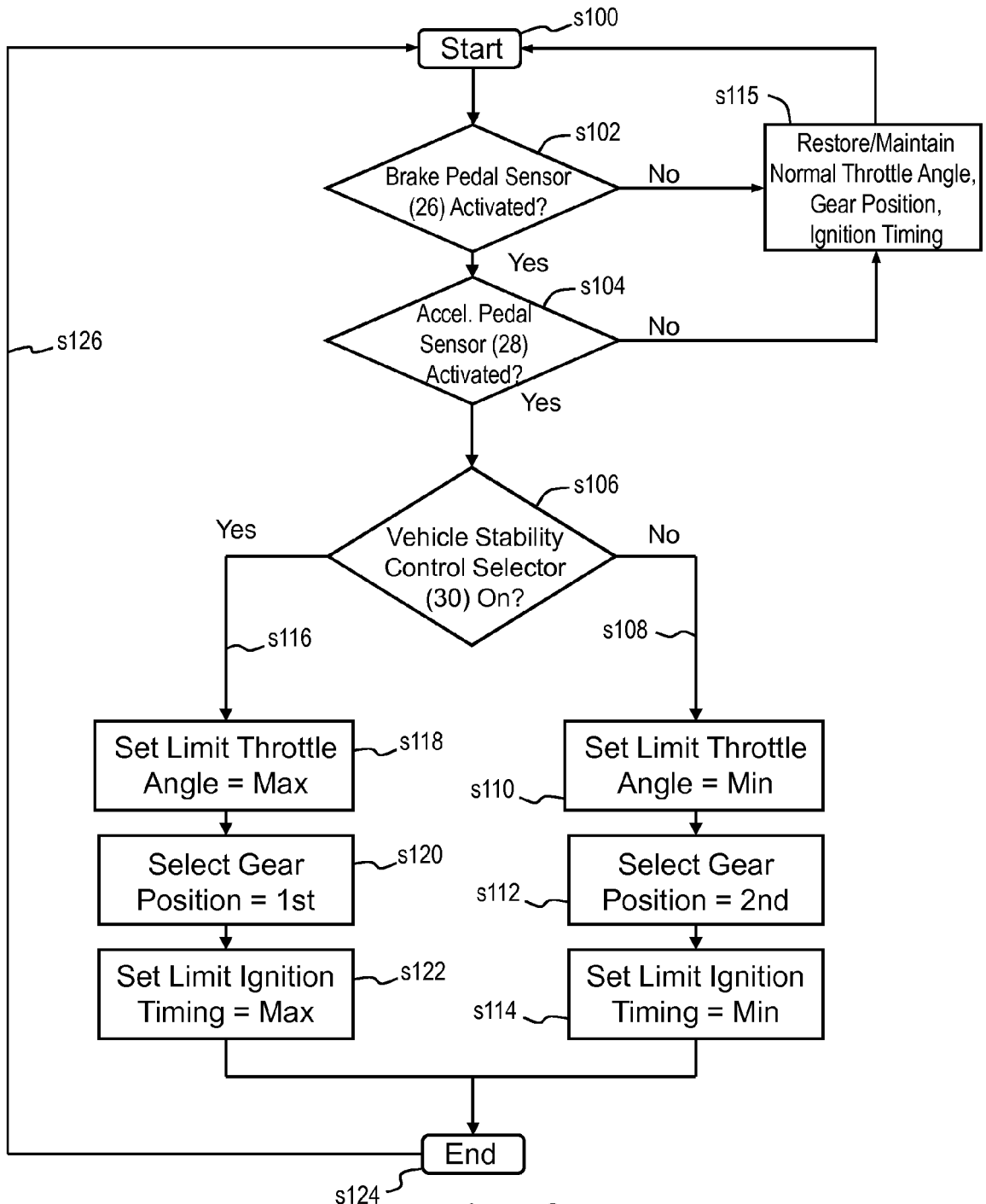
FIG. 2 is a flow diagram showing operational steps associated with the system of FIG. 1.

The process of FIG. 2 ends at s124. The process may be repeated as desired, as indicated by s126.

While this invention has been shown and described with respect to a detailed embodiment thereof, it will be understood by those skilled in the art that changes in form and detail thereof may be made without departing from the scope of the claims of the invention.

What is claimed is:

1. A method for controlling operational characteristics of a drivetrain of a vehicle, comprising the steps of:
   providing the drivetrain with an engine, the engine being controlled by a positionable throttle and a settable ignition timing advance;
   providing the drivetrain with a transmission coupled to the engine, the transmission having a plurality of gear settings;
   monitoring an actuation status of a positionable, operator-controlled brake pedal;
   monitoring an actuation status of a positionable, operator-controlled accelerator pedal;
   monitoring an engagement status of a stability control system;
   while both the brake pedal and the accelerator pedal are simultaneously actuated and the stability control system is not engaged, setting the throttle to a predetermined first position, setting the ignition timing to a predetermined advance corresponding to the first throttle position, and selecting a first gear setting of the transmission; and while both the brake pedal and the accelerator pedal are simultaneously actuated and the stability control system is engaged, setting the throttle to a predetermined second position, setting the ignition timing to a predetermined advance corresponding to the second throttle position, and selecting a second gear setting of the transmission.

2. The method of claim 1, further comprising the step of selecting a predetermined intermediate gear setting for the first gear setting of the transmission.

3. The method of claim 1, further comprising the step of selecting a predetermined minimum throttle condition for the first throttle position.

4. The method of claim 3, further comprising the steps of:
upon subsequent de-actuation of the brake pedal while the accelerator pedal is actuated and the stability control system is not engaged, selecting a predetermined low gear setting for the first gear setting of the transmission; and gradually increasing the output of the drivetrain to a predetermined amount corresponding to the position of the accelerator pedal.

5. The method of claim 1, further comprising the step of selecting a predetermined low gear setting for the second gear setting of the transmission.

6. The method of claim 1, further comprising the step of selecting a predetermined maximum-limit throttle condition for the second throttle position.

7. The method of claim 6, further comprising the step of:
upon subsequent de-actuation of the brake pedal while the accelerator pedal is actuated and the stability control system is engaged, increasing the output of the drivetrain to a predetermined amount corresponding to the position of the accelerator pedal.

8. The method of claim 1, further including the step of providing the drivetrain with a throttle position actuator to control the throttle position.

9. The method of claim 1, further including the step of providing the drivetrain with an ignition timing control to control the ignition timing advance setting.

10. The method of claim 1, further including the step of providing the drivetrain with a transmission gear selector to control the gear setting of the transmission.

11. The method of claim 1, further including the steps of:
providing a sensor to monitor the actuation status of the brake pedal;
providing a sensor to monitor the actuation status of the accelerator; and
monitoring the engagement status of the stability control system by one of monitoring a control selector switch or providing a status sensor.

12. The method of claim 11, further comprising the step of selecting one of an encoder, a switch and a transducer for each of the sensors.

13. The method of claim 1, further including the step of providing a stability control selector switch actuable by an operator of the vehicle to selectably engage the stability control system.

14. A method for controlling operational characteristics of a drivetrain of a vehicle, comprising the steps of:
providing the drivetrain with an engine, the engine being controlled by a positionable throttle and a settable ignition timing advance;
providing the drivetrain with a transmission coupled to the engine, the transmission having a plurality of gear settings;
monitoring an actuation status of a positionable, operator-controlled brake pedal;
monitoring an actuation status of a positionable, operator-controlled accelerator pedal;
monitoring an engagement status of a stability control system;
while both the brake pedal and the accelerator pedal are simultaneously actuated and the stability control system is not engaged, setting the throttle to a predetermined minimum throttle condition, setting the ignition timing to a predetermined advance corresponding to the minimum throttle position, and selecting a predetermined intermediate gear setting of the transmission; and
while both the brake pedal and the accelerator pedal are simultaneously actuated and the stability control system is engaged, setting the throttle to a predetermined maximum-limit throttle condition, setting the ignition timing to a predetermined advance corresponding to the maximum-limit throttle position, and selecting a predetermined low gear setting of the transmission.

15. The method of claim 14, further comprising the steps of:
upon subsequent de-actuation of the brake pedal while the accelerator pedal is actuated and the stability control system is not engaged, selecting a predetermined low gear setting for the first gear setting of the transmission; and
gradually increasing the output of the drivetrain to a predetermined amount corresponding to the position of the accelerator pedal.

16. The method of claim 14, further comprising the step of:
upon subsequent de-actuation of the brake pedal while the accelerator pedal is actuated and the stability control system is engaged, increasing the output of the drivetrain to a predetermined amount corresponding to the position of the accelerator pedal.

17. The method of claim 14, further including the step of providing the drivetrain with a throttle position actuator to control the throttle position.

18. The method of claim 14, further including the step of providing the drivetrain with an ignition timing control to control the ignition timing advance setting.

19. The method of claim 14, further including the step of providing the drivetrain with a transmission gear selector to control the gear setting of the transmission.

20. The method of claim 14, further including the step of providing a stability control selector switch actuable by an operator of the vehicle to selectably engage the stability control system.

* * * * *